United States Patent [19]

Osterhuber

[11] Patent Number: 4,797,200
[45] Date of Patent: Jan. 10, 1989

[54] UPGRADING HEAVY OILS BY SOLVENT DISSOLUTION AND ULTRAFILTRATION

[75] Inventor: Edward J. Osterhuber, Phillipsburg, N.J.

[73] Assignee: Exxon Research and Engineering Company, Florham Park, N.J.

[21] Appl. No.: 606,938

[22] Filed: May 4, 1984

[51] Int. Cl.$^4$ .................. C10C 3/00; C10G 21/06
[52] U.S. Cl. .................. 208/308; 208/309; 210/637; 210/651; 585/818; 585/819
[58] Field of Search .................. 208/308, 309, 251 R; 210/637, 651; 585/818, 819

[56] References Cited

U.S. PATENT DOCUMENTS

| | | | |
|---|---|---|---|
| 2,650,898 | 9/1953 | Case | 208/308 |
| 2,947,687 | 8/1960 | Lee | 210/23 |
| 2,958,657 | 11/1960 | Bunning et al. | 208/308 |
| 2,960,462 | 11/1960 | Lee et al. | 208/308 |
| 2,970,106 | 1/1961 | Binning et al. | 208/308 |
| 2,980,602 | 4/1961 | Garwin | 208/309 |
| 2,985,588 | 5/1961 | Binning et al. | 208/308 |
| 3,043,891 | 7/1962 | Stuckey | 260/674 |
| 3,305,595 | 2/1967 | Paulson | 208/309 |
| 3,370,102 | 2/1968 | Leroy | 260/674 |
| 3,370,107 | 2/1968 | Carpenter | 260/674 |
| 3,481,865 | 12/1969 | Samuels, Jr. | 208/309 |
| 3,864,418 | 2/1975 | Hughes et al. | 208/308 |
| 3,919,075 | 11/1975 | Parc | 208/180 |
| 3,990,963 | 11/1976 | Audibert | 208/179 |
| 4,062,882 | 12/1977 | Gupta | 260/428.5 |
| 4,115,465 | 9/1978 | Elfert et al. | 208/308 |
| 4,368,112 | 1/1983 | Thompson et al. | 208/308 |
| 4,411,790 | 10/1983 | Arod et al. | 208/187 |
| 4,532,029 | 7/1985 | Black et al. | 208/308 |

FOREIGN PATENT DOCUMENTS

| | | | |
|---|---|---|---|
| 0041013 | 12/1981 | European Pat. Off. | 208/179 |
| 079328 | 1/1988 | Japan | 208/179 |
| 1243507 | 8/1971 | United Kingdom | 208/179 |
| 2116071 | 3/1982 | United Kingdom | 208/179 |

OTHER PUBLICATIONS

Lube Oils, Defines et al. Information Chemie No. 175, pp. 127-137 3/78 Chemie.

Primary Examiner—H. M. S. Sneed
Assistant Examiner—Helane Myers
Attorney, Agent, or Firm—E. T. Wheelock; J. J. Dvorak

[57] ABSTRACT

This invention relates to a method for upgrading heavy oils for use in subsequent hydrocarbon processing. The process is especially suitable for removing metals which are in the form of nickel or vanadium organic compounds and for lowering the Conradson Carbon Residue of the resulting oil. The process includes the steps of diluting the heavy oil with a solvent which completely solvates the oil and subjecting the resulting mixture to an ultrafiltration step using selected membranes.

10 Claims, 1 Drawing Sheet

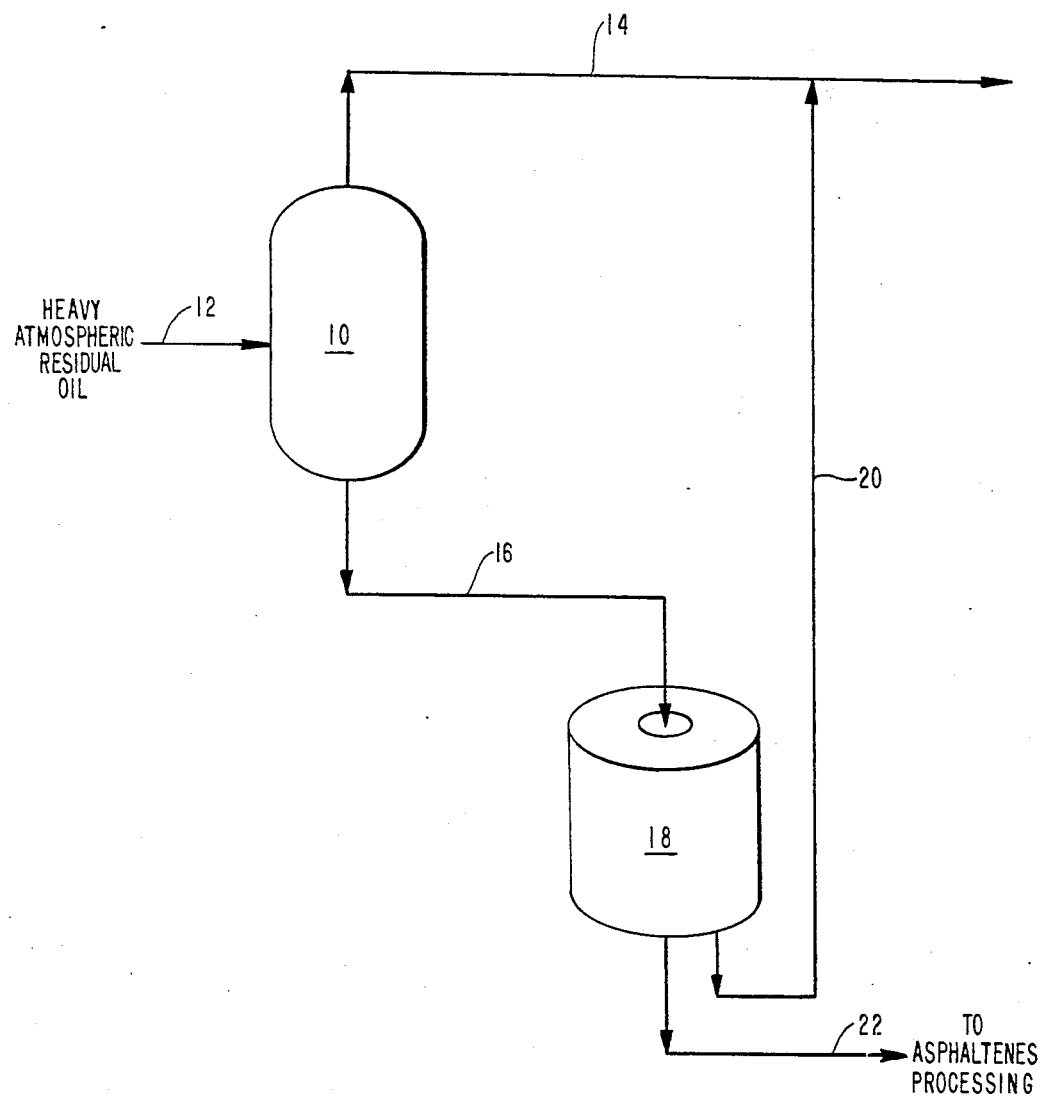

UPGRADING HEAVY OILS BY SOLVENT DISSOLUTION AND ULTRAFILTRATION

FIELD OF THE INVENTION

This invention relates to a method for upgrading heavy oils for use in subsequent hydrocarbon processing. The process is especially suitable for removing metal compounds such as nickel or vanadium porphyrinic compounds and lowering the Conradson Carbon Residue ("CCR") of the resulting oil. The process includes the step of diluting a heavy oil and then contacting the resulting mixture with a semi-permeable membrane at high pressures and moderate temperatures. The solvent is one which does not swell the semi-permeable membrane and is completely miscible with the heavy oil.

BACKGROUND OF THE INVENTION

The world supply of light crudes and those having only minor concentrations of sulfur and contaminant metals is quickly decreasing. Crude oils available on the open market today often contain high percentages of sulfur-bearing compounds and significant amounts of metal-containing organic compounds. These crudes are, in comparison to those used in the past, of a higher average molecular weight. In spite of the change in crude oil feedstocks, the products into which crude oils are made, e.g., gasoline, fuel oil, diesel, etc., remain substantially the same. Consequently, additional upgrading techniques are necessary to make optimum use of available crude oils.

Typical front-end refinery processing steps include a desalting step, which removes salt and other water soluble compounds; an atmospheric pressure distillation step, which separates lower boiling hydrocarbon components and produces a heavy atmospheric residual oil ("HAR"); and a vacuum distillation step which produces a stream of middle boiling distillates and a heavy vacuum residual oil ("HVR").

Heavy oils are not, in a typical refinery economic scheme, products which are of themselves desirable end products. They typically must be converted into some other form before they become valuable. These heavy oils, particularly the vacuum residual oils, are particularly unsuitable for conventional processing techniques such as thermal or catalytic cracking and therefore require an alternative upgrading. The oils are complex mixtures containing three general fractions: so-called "saturates", "aromatics", and "polars". Of the factors which adversely influence the quality of the heavy oils, the most noteworthy are the coke-forming tendency, metals content (particularly vanadium and nickel), nitrogen content and "polar" content. Each of these factors typically becomes more of a problem with increasing molecular weight.

One desirable upgrading technique would be to separate the heavy oil into two portions: one fraction being of high molecular weight and low quality, and the other, a desirable fraction of low molecular weight and high quality.

It has now been found that it is possible to upgrade heavy oils by mixing them with one or more solvents and applying the resulting mixture to an ultrafiltration membrane at high pressures to produce a permeate which is low in coke-forming tendencies and metal-containing compounds.

SUMMARY OF THE INVENTION

As noted above, this invention relates to a process for upgrading heavy oils by removing at least a portion of the polar hydrocarbons and metal-containing organic compounds contained therein. The oil is desirably selected from the group of raw or reduced crude oils, atmospheric residual oils, vacuum residual oils, and hydrorefined atmospheric or vacuum residual oils. The heavy oil is mixed with a solvent and introuced to a membrane under a high applied differential pressure, preferably between about 750 kPa and about 1500 kPa. The temperature of the membrane separation step may be between about 20° C. and about 125° C., but is preferably about 25° C. The membrane is made of an organic polymeric material of the type which does not swell when contacted either with heavy oil or the mixture containing the included solvent. The membrane produces a permeate fraction which is enriched in aromatic and saturated hydrocarbons.

Preferred membranes include those of modified cellulose and polyvinylidine fluoride. The fraction retained on the first side of the membrane, i.e., the retentate fraction, is enriched in polar and metal-containing hydrocarbons. The solvent is removed from the permeate fraction and may be recycled for further use.

The permeate fraction typically has the physical and chemical characteristics of a gas oil and may be used as would any other gas oil, e.g., as a catalytic cracker feed either with or without further hydrotreatment.

BRIEF DESCRIPTION OF THE DRAWING

The FIGURE shows a schematic flow chart in which the invention process is used to upgrade heavy vacuum residual oil.

DESCRIPTION OF THE PREFERRED EMBODIMENT

This process is for upgrading heavy oils. Heavy oils for the purposes of this invention include raw crudes, reduced crudes, heavy atmospheric residual oils, heavy vacuum residual oils, hydrorefined crude oils and atmospheric or vacuum residual oils, and synthetic oils such as shale oil, tar sand products, and coal liquefaction products. They may boil in the range of about 650° F. to about 1200° F. or more at atmospheric pressure.

The heavy oil is diluted with an organic solvent in an amount and at a ratio selected to completely dissolve the treated oil. Desirably the process uses a non-polar organic solvent selected from the group of chloroform and toluene. The solvent and membrane, discussed below, are chosen so that the membrane does not undergo substantial swelling upon contact with the solvent-heavy oil mixture.

The mixture is then placed in contact with an ultrafiltration membrane at a pressure between 750 kPa and about 1500 kPa. The temperature of contact desirably is between 20° C. and about 125° C., but preferably is about 25° C. The membrane contemplated in the invention is polymeric organic type, preferably of a modified cellulosic or polyvinylidine fluoride. The preferred membranes are available commercially as Nuclepore type C and type F and may be obtained from the Nuclepore Corporation of Pleasanton, Calif.

EXAMPLE 1

Heavy Arab vacuum residual oil having an atmospheric boiling point of 950° F.+ was dissolved in chloroform in an approximate weight ratio of solvent to oil of 7:1. The resulting mixture was placed in a stirred batch ultrafiltration cell above a Nuclepore type F (polyvinylidine fluoride) membrane having a nominal molecular weight cutoff of 5,000. The cell was pressurized to 1,000 kPa with nitrogen gas at a temperature of 27° C. The pressure was released when permeation flow stopped.

Analysis of the feed and two product fractions are shown in Table 1.

TABLE 1

| Analysis of Fractions | Feed | Permeate | Retentate |
|---|---|---|---|
| Yield (wt. %) | — | 37 | 63 |
| Conradson Carbon (wt. %) | 22.1 | 10.34 | 29.38 |
| VPO Molecular Weight | | | |
| in Toluene | 1098 | 789 | 1605 |
| in Dichlorobenzene | 1010 | 705 | 1380 |
| Clay-Gel Analysis (wt. %) | | | |
| Saturates & Aromatics | 33.4 | 57.7 | 21.0 |
| Polars (Toluene Soluble) | 34.3 | 31.5 | 25.1 |
| Polars (Acetone Soluble) | 25.5 | 14.2 | 41.1 |

It is clear that the polar content of the retentate is significantly higher than that of the permeate.

EXAMPLE 2

Heavy Arab vacuum residual oil having an atmospheric boiling point of 950° F.+ was dissolved in toluene in the approximate weight ratio of solvent to oil at about 1:1. The mixture (about 250 ml.) was placed in a stirred batch ultrafiltration cell using a Nuclepore type F ultrafiltration membrane having a nominal molecular weight cutoff of 5000. The cell was stirred and pressurized to about 1,000 kPa with gaseous nitrogen at a temperature of 27° C. Twenty collections of permeate were made, each of about 100 ml. of solution. After each collection, the partially depleted feed was replenished by adding the correct volume of fresh toluene to the cell to make up a total mixture of 250 ml. The experiment was considered complete when the amount of oil in the permeate was consistently less than 1 gram.

Each batch of permeate was evaporated to remove toluene. The overall yield of permeate was 67 weight %.

The analyses of the feed and products are shown in Table 2.

TABLE 2

| | Feed | Permeates #1 + #2 | 3 | 6(7) | #13-20 combined | Retentate |
|---|---|---|---|---|---|---|
| Yield (wt %) | — | 8.7 | 9.9 | 4.7 | 10.4 | 34 |
| Microcarbon Residue (wt %) | 22.1 | 8.5 | 9.1 | 10.5 | 13.9 | 41.0 |
| Clay-Gel Analysis (wt %) | | | | | | |
| Saturates & Aromatics | 33.4 | — | 64.7 | 60.1 | 35.2 | 5.8 |
| Polars (Toluene soluble) | 34.3 | — | 28.3 | 32.6 | 36.7 | 26.1 |
| Polars (Acetone soluble) | 25.5 | — | 12.3 | 14.2 | 26.7 | 52.8 |
| % C | 83.9 | — | 84.2 | 83.9 | 83.2 | 82.7 |
| % H | 9.9 | — | 10.7 | 10.7 | 10.7 | 8.6 |
| H/C | 1.4 | — | 1.5 | 1.5 | 1.5 | 1.3 |
| % N | 0.5 | — | 0.2 | .2 | — | — |
| % S | 5.7 | — | 4.4 | 4.6 | 4.9 | 6.7 |
| V (ppm) | 180 | 25.8 | 26.8 | (44.8) | 81.0 | 429 |
| Ni (ppm) | 43 | 7.1 | 7.3 | (10.0) | 15.5 | 118 |
| VPO M.W. | | | | | | |
| in DCB | 1010 | — | 691 | 744 | 978 | — |
| in Toluene | 1098 | — | 640 | 794 | — | — |

The Conradson Carbon Residue of the starting HVR feed was 22.1%. It can be seen that ultrafiltration separated this feed into two fractions, one of which (the retentate) was obtained in 34% yield and had a CCR value of 41.0%. The other fraction (permeate) was recovered in 67% yield and, by balancing with feed and retentate, had an average Conradson Carbon Residue of 12%. The latter value may be confirmed by Conradson Carbon Residue values of the individual permeate collection. The permeate also had much lower vanadium, nickel, and "polar" content, and somewhat lower sulfur content and average molecular weight than the feed.

EXAMPLE 3

A heavy Arab vacuum residual oil having an atmospheric boiling point of 950° F.+ was ultrafiltered using the solvent and procedure employed in Example 2. However, the membrane used was a Nuclepore type C having a nominal molecular weight cutoff of 5,000. All of the permeates were combined and the solvent removed. The permeate yield was 44.7 wt.% and the permeate had a CCR of 8.6%. The retentate yield was about 56-8 wt.% and the retentate had a CCR of 32.2%.

EXAMPLE 4

Residfined heavy Arab vacuum residual oil (CCR=5.8%) was ultrafiltered using the solvent and process conditions of Example 2. The initial permeate oil had an CCR of 4.3%. The total collected permeate was obtained in 95% yield and had an average CCR of 5%. The retentate was obtained in 5% yield and had a CCR of 54.4%.

As is apparent from the Examples, the solvent-diluted heavy oils are separated into two fractions. The permeate fraction contains a significant portion of the original aromatics and saturates and the residue (or retentate) contains the polar compounds and metal-containing organics. Once the solvent is removed from the permeate, the permeate may be used in any number of ways.

This inventive process may be used as an integral portion of a heavy oil upgrading process such as that shown in the FIGURE.

Heavy atmospheric residual oil (HAR) is introduced into a vacuum pipe still distillation tower 10 via line 12. The vacuum tower is operated at less than atmospheric pressure and often uses auxiliary steam injection to enhance the hydrocarbon separation. The overhead product in line 14 is often known as vacuum gas oil (VGO) and may be used in a number of the following refinery processing steps, such as catalytic cracking.

The vacuum tower bottom stream 16 is heavy vaccum oil (HVR) and may be treated in an ultrafiltration device 18. These devices are of known design. The permeate leaves the ultrafiltration device 18 through line 20 and, because of the decreased content of metals and polar hydrocarbons, may be mixed with the vacuum gas oil stream 14.

The retentate stream 22 may then be fed, if desired, to a known deasphalting process using, e.g., propane or butane.

The permeate may be used in subsequent refining processes, either alone or in admixture with similar oils, in the same way gas oils are used.

For instance, introduction of the permeate produced from an atmospheric or vacuum residue to a visbreaker process will increase that process efficiency. Visbreaker conversion efficiency is typically limited by the occurrence of furnace coking which shortens the run length. Introduction of a higher grade feedstock to the unit allows a higher feed coil outlet temperature and longer furnace residence time. Effective soaking drum volume and feed conversion are therefore improved.

Permeate produced from heavy crude, vacuum, or atmospheric residual oils may alternatively be introduced into a catalytic hydrofining unit. In such a unit the oil is treated in the presence of hydrogen to eliminate or to reduce the concentration of sulfur or nitrogenous compounds present in the feed. By lowering the metal content of the feedstream by this process, the life of the catalyst used in hydrofining process may be increased. The removed metals (particularly vanadium and nickel) would otherwise have a tendency to foul or to deactivate the catalyst.

In any event, although the examples shown herein depict a batch process, it should be apparent to one having ordinary skill in this art that this inventive process may be practiced in a continuous fashion using known ultrafiltration apparatus.

The foregoing disclosures and description of the invention are only illustrative and explanatory thereof. Various changes in the makeup of the solvent, membrane, and details of the exemplified process of operation may be made within the scope of the appended claims withut departing from the spirit of the invention.

What is claimed is:

1. A method for the separation of a heavy oil comprising aromatic, saturated, polar, and metal-containing hydrocarbons into a permeate fraction enriched in aromatic and saturated hydrocarbons and a retentate fraction enriched in polar and metal-containing hydrocarbons comprising the steps of:

diluting the heavy oil selected from raw crudes, reduced crudes, heavy atmospheric residual oils, heavy vacuum residual oils, hydrorefined crude oils, hydrorefined atmospheric residual oils, shale oil, tar sand products, and coal liquefaction products with a solvent which is completely miscible with the heavy oil in an amount sufficient to completely dissolve the oil so as to produce an ultrafiltration feed;

contacting the ultrafiltration feed with a first side of a continuous generally unswelled organic membrane selected from the group consisting of those comprising cellulose or polyvinylidine fluoride at a pressure between about 750 kPa and about 1500 kPa and at a temperature between 20° C. and about 125° C.;

recovering a permeate fraction enriched in aromatic and saturated hydrocarbons from a second side of the membrane, and recovering a retentate fraction enriched in polar and metal-containing hydrocarbons from the first side of the membrane.

2. The method of claim 1 wherein the metals in the metal-containing hydrocarbons are selected from the group consisting of nickel, vanadium, and mixtures thereof.

3. The method of claim 2 wherein the metal-containing hydrocarbons are porphyrinic.

4. The method of claim 1 wherein the membrane comprises polyvinylidine fluoride.

5. The method of claim 4 wherein said membrane has a nominal molecular weight cutoff of 5,000 or less.

6. The method of claim 1 wherein the membrane comprises modified cellulose.

7. The method of claim 6 wherein the membrane has a nominal molecular cutoff of 5,000 or less.

8. The method of claim 1 wherein the solvent is selected from the group consisting of chloroform and toluene.

9. The method of claim 8 wherein the solvent is chloroform.

10. The method of claim 8 wherein the solvent is toluene.

* * * * *